Dec. 16, 1924.

R. W. SCHROEDER

COMBINED FLOW METER AND SPEEDOMETER

Original Filed July 23, 1921    3 Sheets-Sheet 1

1,519,269

Inventor
Rudolph W. Schroeder
By Missen & Crane Attys.

Dec. 16, 1924.
R. W. SCHROEDER
1,519,269
COMBINED FLOW METER AND SPEEDOMETER
Original Filed July 23, 1921  3 Sheets-Sheet 2
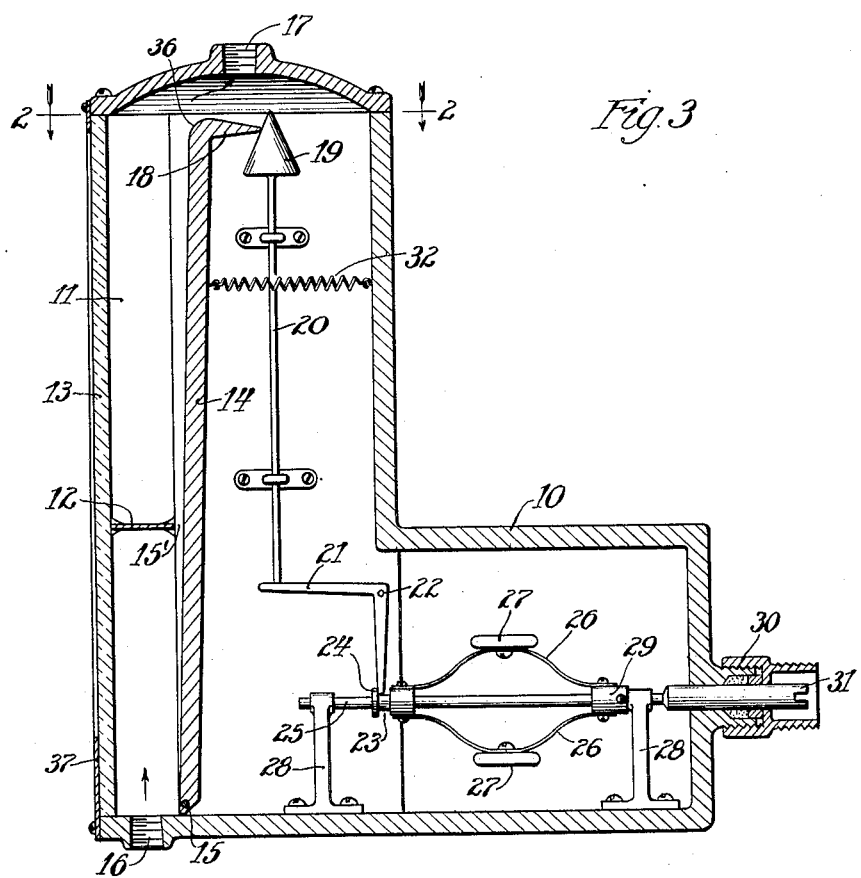
Fig.3
Fig.4
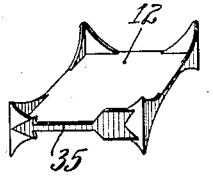
Inventor
Rudolph W. Schroeder
By Nissen & Crane Attys.

Patented Dec. 16, 1924.

1,519,269

UNITED STATES PATENT OFFICE.

RUDOLPH W. SCHROEDER, OF CHICAGO, ILLINOIS.

COMBINED FLOW METER AND SPEEDOMETER.

Application filed July 23, 1921, Serial No. 486,989. Renewed October 30, 1922. Serial No. 598,014.

*To all whom it may concern:*

Be it known that I, RUDOLPH W. SCHROEDER, a citizen of the United States, residing at Chicago, in the county of Cook and State of Illinois, have invented certain new and useful Improvements in Combined Flow Meters and Speedometers, of which the following is a specification.

The invention relates to an instrument for indicating a resultant quantity made up of two components, one of which depends upon the rate of flow of the fluid, and the other of which depends on rate of motion.

The invention has for its object the provision of an instrument of the class named which shall be of improved construction and operation. It is exemplified in the combination and arrangement of parts shown in the accompanying drawings and described in the following specification, and it is more particularly pointed out in the appended claims.

In the drawings—

Fig. 3 is a vertical section on line 3—3 of Fig. 2;

Fig. 4 is a perspective of a movable piston forming a part of the invention;

Figure 1:
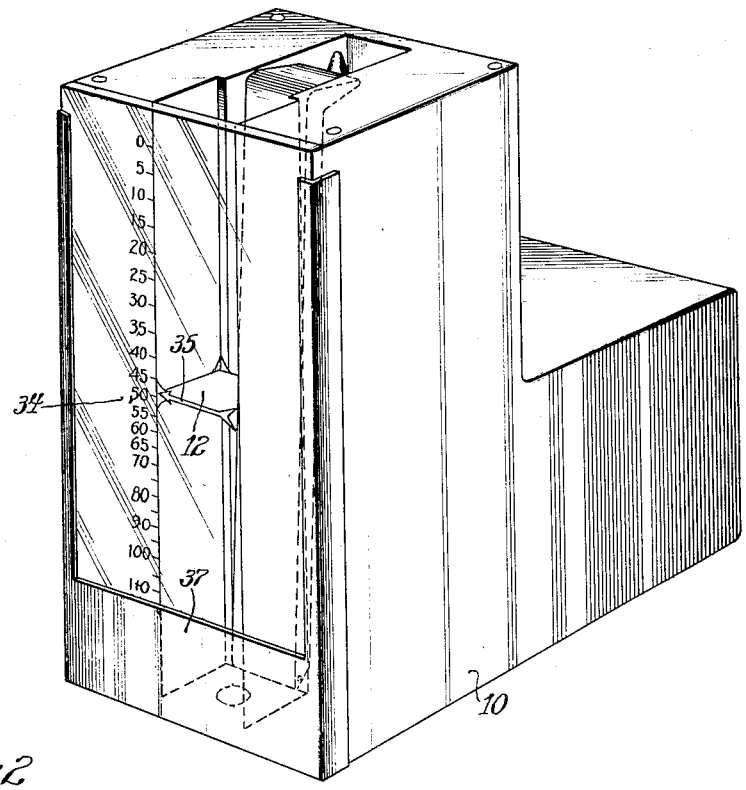
Fig. 1 is a perspective view of an instrument embodying one form of the present invention.
Figure 2:
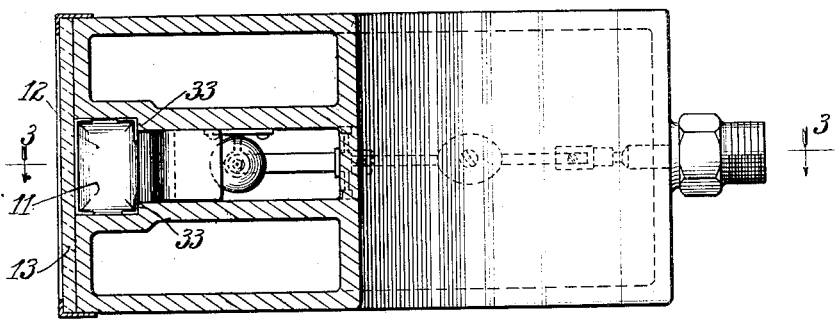
Fig. 2 is a horizontal section on line 2—2 of Fig. 3.

In the operation of automobiles, motorboats, aeroplanes, and other devices, driven by liquid fuel engines it is very desirable that the operator may know the amount of work being done by the engine per unit of fuel consumed at any instant of operation. In motor vehicles this is conveniently expressed in miles of travel per gallon of fuel. In my prior application, Serial No. 465,831, filed April 30, 1921, I have shown one form of instrument for accomplishing this result. The present application shows other forms of instruments in which the component parts are co-related in a different manner from that described in my previous application and in which they cooperate in a different way.

In the embodiment of the invention shown in Figs. 1 to 4, inclusive, a casing 10 is provided having an upright passage 11 in which a piston 12 is mounted for vertical sliding movement. The front side of the passage 11 is closed by a glass plate 13 which permits the piston 12 to be seen at all times during operation of the instrument. The back wall of the passage 11 comprises an upright plate 14 pivoted at 15 to swing toward and away from the passage providing a variable clearance space 15' between the piston 12 and the rear wall of the passage. An intake opening 16 is provided at the lower end of the passage, which opening is connected in any suitable manner with a source of fuel supply for the engine. The fuel enters through the opening 16 and flows upwardly through the passage 11 filling the entire casing 10 and passes out through an opening 17 at the top of the casing which is connected with the carburetor or other instrumentality for supplying fuel to the engine.

When the movable wall 14 is in the position shown in Fig. 3, the passage around the piston 12 between its rear edge and the wall 14 will vary for the different heights of the piston and it will be seen that the height of the piston will depend upon the rate of flow of fluid in the passage, an increase in the rate of flow, raising the piston to a greater elevation.

The upper end of the movable wall 14 is provided with a projection 18 which bears against a conical member 19 carried on the upper end of a vertical shaft 20. The lower end of the shaft 20 rests on one arm of a bell-crank 21 pivoted at 22 to the casing 10 and having the other arm thereof engaging a notch 23 in a sliding collar 24 carried by a horizontal shaft 25. The collar 24 is attached to spring arms 26 of a centrifugal governor having weights 27 and carried by bearing members 28 supported by the casing 10. The spring arms 26 are secured to a block 29 fastened on the shaft 25 so that rotation of the shaft will drive the spring arms and cause the sleeve 24 to slide along the shaft 25 to various positions depending upon the rate of rotation of the shaft. The shaft 25 passes outwardly through a stuffing box 30 and is connected at 31 to the ordinary speedometer shaft of the vehicle.

As the speed of the vehicle increases the bell-crank 21 will be rotated in a counterclockwise direction by the movement of the collar 24 and the shaft 20 and cone 19 will be lowered. This will permit movement of the wall 14 to the right under the influence of spring 32 and thus increase the passage 15 through which the fuel is flowing to the tubular member 11. If the rate of flow is constant the increase of the passage 15 will cause a lowering of the piston 12. The movement of the wall 14 does not interfere with the sliding operation of the piston since the side walls of the passageway 11 are provided with shoulders 33 for guiding the piston. If the speed of the vehicle is kept constant and the rate of flow of fuel is increased without changing the speed, as would be the case in ascending a grade at a uniform speed, the piston 12 will be raised. It is thus seen that the height of the piston is a function of the rate of flow of fuel and of the speed of the vehicle and by properly calibrating the scale 34 the instrument may be made to read directly in distance traveled per unit of fuel consumed, as for instance, in miles per gallon. When the vehicle is standing still the cone 19 will be raised to a sufficient height to bring the inner face of the plate 14 into a vertical position in alinement with the rear edge of the piston 12. If the engine should be started while disconnected from the driving mechanism of the vehicle, the piston 12 will be raised to the top of the passage 11 so that the pointer 35 will indicate zero. The upper edge of the plate 14 is cut away, as shown at 36, to permit flow of fuel to drive the engine with the indicator in zero position. Now, as the vehicle is given an increasing speed, the wall 14 will move rearwardly and the piston will gradually be lowered in proportion to the increasing speed and the pointer 35 will indicate the travel of the vehicle per gallon of fuel at each instant. When the fuel is completely shut off, the piston 12 may be permitted to drop behind the wall 37. If the vehicle is moving without any flow of fuel, the miles per gallon, of course, is infinity, and if the vehicle is standing still, the ratio of rate of travel to the fuel consumed is the ratio of zero to zero, which is an indefinite quantity. Both of these conditions are indicated by the disappearance of the needle behind the wall 37.

Figure 5:
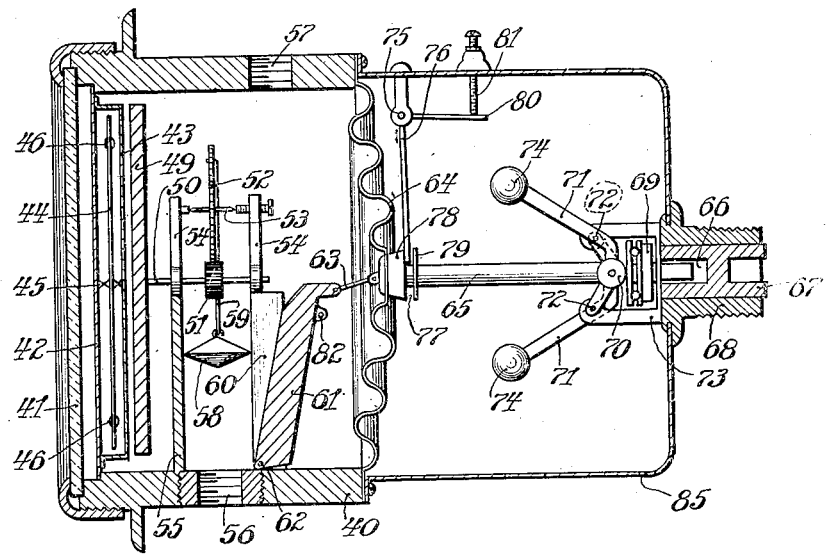
Fig. 5 is a vertical section showing a different form of the invention.
Figure 6:
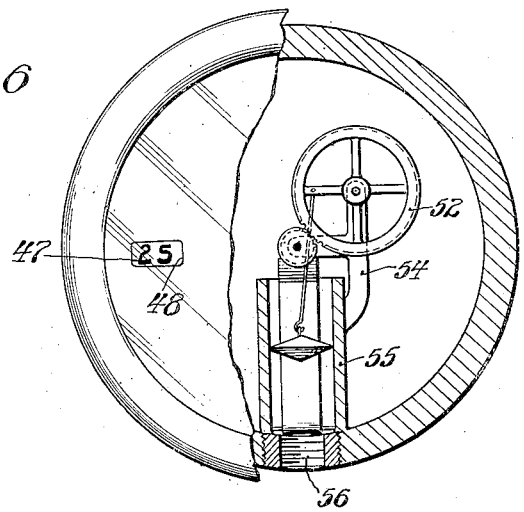
Fig. 6 is a view partly in elevation and partly in section looking at the front of the instrument shown in Fig. 5.

In the form of the invention shown in Figs. 5 and 6, the casing 40 has its front face covered by a glass 41 in the rear of which there is positioned a metal plate 42. The plate 42 carries a second plate 43 offset inwardly therefrom to form a housing in which a disc 44 is mounted to rotate on pivots 45. The parts 42, 43 and 44 are made of non-magnetic material and the disc 44 carries a pair of iron rivets 46 or other small particles of iron secured thereto at diametrically opposite points. The disc 44 carries a series of numbers 47 arranged in a circle upon its front face and the plate 42 is provided with an opening 48 through which the numbers 47 are visible when they reach a position in the rear of the opening 48. The disc 44 is rotated by a bar magnet 49 carried by a shaft 50 and rotated by a pinion 51 which meshes with a gear 52 carried on a spindle 53. It will be apparent that rotation of the bar magnet 49 will cause the iron rivets 46 to rotate the disc 44 in unison with the bar magnet. The spindles 50 and 53 are carried by supports 54 mounted on a tubular member 55 which projects upwardly from the lower wall of the casing 40. The upper end of the member 55 is open and the lower end communicates with an intake pipe 56 which is connected with the source of fuel supply.

An opening 57 is provided in the upper portion of the casing 40 and connects with the carbureter or other device to which the fuel is furnished. A piston 58 is arranged to move up and down in the tubular member 55 and carries a rod 59 attached thereto. The upper end of the rod 59 is connected with the gear wheel 52 so that movement of the piston in the tubular member 55 will impart a partial rotation to the gear wheel and thus move the magnet 49 and the disc 44 to vary the readings of the instrument as seen through the opening 48.

A slot 60 is formed in the rear wall of the member 55 and a bar 61 is pivoted at 62 to swing back and forth in the slot so as to provide a variable passage for the fuel past the piston 58. The operation of this part of the instrument is similar to that described in connection with Figs. 1, 2 and 3. The bar 61 is connected by a link 63 to a diaphragm 64 which closes the rear wall of the casing 40. The diaphragm 64 may be made of thin sheet metal corrugated, as shown, to permit movement thereof. A rod 65 is secured to the diaphragm 64 and is supported at its opposite end in an opening 66 in the end of a speedometer shaft 67. The speedometer shaft 67 rotates in a bearing 68 and is free to turn on the end of the rod 65. The rod 65 carries a thrust bearing 69 against which rollers 70 operate. The rollers 70 are mounted on arms 71 which are pivoted at 72 to a bracket 73 secured to the speedometer shaft 67 to rotate therewith. The outer ends of the arms 71 carry weights 74 which are rotated by the bracket 73 on the speedometer shaft and which tend to move outwardly under the centrifugal force of their rotation, causing the rollers 70 to press against the thrust bearing 69 and move the rod 65 to the right, as shown in Fig. 5.

The diaphragm 64 in its normal position, when the speedometer shaft 67 is not rotating, holds the movable block 61 in a position so that its inner edge is flush with the inner wall of the tubular member 55. As soon as the speedometer shaft begins to rotate the diaphragm will be drawn to the right carrying with it the block 61 and opening the slot 60 to provide a bypass around the piston 58. The more rapid the rotation of the speedometer shaft, the greater will be the bypass opening. It will thus be seen that the position of the piston 58 and the consequent reading of the instrument depends on the rate of flow and the speed of rotation of the speedometer shaft so that the instrument may be calibrated to read in miles per gallon in the manner described in connection with the form of the device previously explained.

In order to adjust the spring tension of the diaphragm 64 an auxiliary spring is pivoted at 75 and has an arm 76 which engages a groove 77 formed between members 78 and 79 on the rod 65. Another arm 80 of the spring engages a screw 81 by which the tension of the spring may be adjusted so as to increase or decrease the pressure against the diaphragm 64. A stop pin 82 is connected with the movable block 61 to limit the inward movement of the block in the slot 60.

The gasoline entering through the pipe 56 passes upwardly in the chamber between the plate 43 and the diaphragm 64 and escapes through the opening 57 to the carbureter of the engine. The speedometer mechanism is contained in a casing 85 in the rear of the diaphragm 64 which is always free from gasoline so that in this form of the invention it is not necessary for the speedometer mechanism to be immersed in the liquid fuel.

The dial plate 44 is also contained in a dry chamber so that the readings are in no way obscured by the liquid and there is no danger of escape of the gasoline in case the cover glass is broken.

I claim:—

1. The combination with a flow meter, of a speed-controlled device for varying the operation of said flow meter.

2. The combination with a flow meter and a speedometer, of means actuated by the speedometer for varying the readings of the flow meter.

3. The combination with a flow meter and a speedometer, of means actuated by one of said instruments for affecting the operation of the other to vary the readings thereof.

4. The combination with a flow meter having a passage for the flow of fluid therethrough, of a speedometer, and means actuated by said speedometer for varying said passage.

5. The combination with a flow meter having a variable passage and an indicator actuated by the flow of fluid through said passage to assume different positions corresponding to different sizes of said passage, of a speedometer, and mechanism controlled by said speedometer for varying said passage.

6. The combination with a flow meter having an indicator therein and a passage for permitting flow of fluid past said indicator, said passage varying in size for different positions of said indicator, of a speedometer, and mechanism controlled by said speedometer for providing variation in said passage in addition to the variation due to the position of said indicator.

7. The combination with a flow meter having a passage for fluid therethrough, of means depending on the rate of flow of said fluid for varying said passage, a speedometer, and means actuated by said speedometer for controlling the rate of variation of said passage by said first-mentioned means.

8. The combination with a flow meter having a passage for the flow of fluid therethrough, of a piston arranged to move along said passage, the effective size of said passage varying according to the position of said piston, a speedometer, and means actuated by said speedometer for changing the variation of said passage for the different positions of said piston.

9. The combination with a flow meter having a passage for the flow of fluid therethrough and a speedometer for changing the opening through said passage.

10. The combination with a flow meter having a tapered passage therethrough and a speedometer arranged to vary the taper of said passage.

11. The combination with a flow meter having a tapered passage therethrough, of a piston movable in said passage to various positions depending on the rate of flow through said passage, and a speedometer arranged to vary the taper of said passage.

12. The combination with a flow meter having a passage therethrough, one wall of said passage being movable, and a speedometer arranged to shift the position of said movable wall.

13. The combination with a flow meter having a passage for the flow of fluid therethrough, one wall of said passage being pivoted, and a speedometer arranged to swing said wall upon its pivot to vary the opening through said passage.

14. The combination with a flow meter having an elongated passage therethrough, of a piston arranged to move along said passage, one wall of said passage being arranged to move to various angular positions to cause the sectional area of said passage to vary along the length thereof, and a speedometer for shifting said movable wall.

15. The combination with a flow meter having an elongated passage, a portion of the wall of said passage being pivoted to swing into different angular positions to provide a tapered opening through said passage, of a piston arranged to move along said opening, and a speedometer for swinging said wall upon its pivot to vary the opening of said passage and affect the operation of said piston in a manner depending upon the rate of movement of said speedometer.

16. A speedometer having an elongated passage, a piston movable in said passage, a portion of the wall of said passage being movable into and out of position to permit flow of fluid past said piston, and a bypass to permit flow of fluid past said piston when said piston is in a zero position.

17. In combination, a flow meter having a conduit for the passage of fluid therethrough, a portion of the wall of said conduit being pivoted to swing into and out of position parallel to the opposite wall thereof, a piston arranged to fit said conduit when said wall is in parallel position but providing a passage for the flow of fluid past said piston when said wall is swung out of parallel position, said wall being cut away to form a bypass for fluid past said piston when said wall is in parallel position and said piston is at its zero position.

18. In combination, a flow meter having an elongated passage for the flow of fluid therethrough, a piston arranged to travel along said passage, a portion of the wall of said passage being pivoted to swing into and out of parallelism with the opposite wall of said passage, a speedometer, means controlled by said speedometer for swinging said wall about its pivot, and an indicator and scale for indicating readings depending on the flow of fluid through said conduit and the operation of said speedometer.

19. The combination with a flow meter having a piston for indicating the rate of flow of fluid therethrough and a speedometer interconnected with said flow meter for varying the operation of said piston.

20. In combination, a casing having a passage therethrough, inlet and outlet openings for directing fluid through said casing, a piston movable in said passage to various positions depending upon the rate of flow of fluid through said passage, a speedometer mounted within said casing, and means controlled by said speedometer for varying said passage and altering the operation of the piston therein to cause the readings of said piston to depend both upon the rate of flow of fluid through said casing and the speed of said speedometer.

In testimony whereof I have signed my name to this specification on this 16th day of July, A. D. 1921.

RUDOLPH W. SCHROEDER.